US007651286B2

(12) United States Patent
Tischler

(10) Patent No.: US 7,651,286 B2
(45) Date of Patent: Jan. 26, 2010

(54) METHOD ARRANGEMENT AND COMPUTER SOFTWARE FOR THE PRINTING OF A SEPARATOR SHEET BY MEANS OF AN ELECTROPHOTOGRAPHIC PRINTER OR COPIER

(75) Inventor: Karl M. Tischler, Neuburg/Donau (DE)

(73) Assignee: Oce Printing Systems GmbH, Poing (DE)

( * ) Notice: Subject to any disclaimer, the term of this patent is extended or adjusted under 35 U.S.C. 154(b) by 356 days.

(21) Appl. No.: 10/534,646

(22) PCT Filed: Nov. 12, 2003

(86) PCT No.: PCT/EP03/12663

§ 371 (c)(1),
(2), (4) Date: Aug. 5, 2005

(87) PCT Pub. No.: WO2004/046908

PCT Pub. Date: Jun. 3, 2004

(65) Prior Publication Data

US 2006/0045596 A1    Mar. 2, 2006

(30) Foreign Application Priority Data

Nov. 19, 2002   (DE) .............................. 102 53 903

(51) Int. Cl.
*G06F 3/12* (2006.01)
(52) U.S. Cl. ........................ 400/62; 400/61; 400/70; 400/76; 358/1.18

(58) Field of Classification Search ............... 400/61, 400/62, 70, 76; 358/1.1, 1, 18, 1.13, 1.15–1.18, 358/1.9
See application file for complete search history.

(56) References Cited

U.S. PATENT DOCUMENTS

| 5,316,279 | A | | 5/1994 | Corona et al. |
| 5,452,062 | A | * | 9/1995 | Baldwin et al. ............. 399/382 |
| 6,227,531 | B1 | | 5/2001 | Guerrero et al. |
| 6,650,433 | B1 | * | 11/2003 | Keane et al. ................ 358/1.15 |
| 6,795,664 | B2 | * | 9/2004 | Sugimoto ..................... 399/81 |
| 6,828,990 | B2 | * | 12/2004 | Krolczyk et al. ............. 715/777 |
| 2003/0133157 | A1 | * | 7/2003 | Hayashi ...................... 358/1.18 |
| 2003/0222916 | A1 | * | 12/2003 | Kuwata et al. ............... 345/777 |

FOREIGN PATENT DOCUMENTS

| DE | 694 10 833 | 12/1998 |
| EP | 1 246 051 | 10/2002 |
| WO | WO 01/67226 | 9/2001 |

\* cited by examiner

*Primary Examiner*—Daniel J Colilla
(74) *Attorney, Agent, or Firm*—Schiff Hardin LLP

(57) ABSTRACT

In a method or system for printing a separator sheet with a printer or copier, with aid of a first program module, at least first data are generated that contain at least information for formatting of elements of at least one separator sheet, the elements to be printed on a register tab of the at least one separator sheet. The first data are processed with aid of a second program module so that second data are generated which print data for generation of a print image on the register tab are added to a print data stream. At least the register tab of the one separator sheet is printed with a print image by the printer or copier.

19 Claims, 14 Drawing Sheets

METHOD ARRANGEMENT AND COMPUTER SOFTWARE FOR THE PRINTING OF A SEPARATOR SHEET BY MEANS OF AN ELECTROPHOTOGRAPHIC PRINTER OR COPIER

BACKGROUND

The preferred embodiment concerns a method for printing of a separator sheet, in particular with the aid of an electrophotographic printer or copier. The preferred embodiment also concerns an arrangement and computer software for printing of a separator sheet with aid of an electrophotographic printer or copier.

First data contain information of elements of a separator sheet to be printed on a register tab. Various text and/or graphic programs such as, for example, Microsoft Word, Corel Draw, Illustrator, Pagemaker and QuarkXpress are known via which the outlines of a separator sheet can be recreated with register tabs and texts can be positioned on the register tab. Furthermore, printer-specific programs such as DigiPath by the company Xerox, Micropress by the company T/R-Systems and Imagesmart by the company Heidelberger are known with which a print data stream is generated for printing of the separator sheets.

However, a significant manual effort is required in the printing of separator sheets with aid of these known programs, in particular in the positioning of the text on the register tab of the separator sheet. An automatic operation, what is known as a batch operation for insertion of separator sheets into an existing print data stream, is not known. Also, no operating system-spanning solutions are known in which pre-configured separator sheets can be integrated into a print data stream existing then at a later point in time, whereby the configuration of the separator sheets occurs with the aid of a data processing system with a first operating system and the inclusion of the separator sheets into an existing print data stream with aid of a data processing system occurs with a second operating system.

SUMMARY

It is an object to specify a method, an arrangement as well as a computer software for printing of a separator sheet, in particular with the aid of an electrophotographic printer or copier, in which the printing of a separator sheet is possible in a simple manner and with low operating effort.

In a method or system for printing a separator sheet with a printer or copier, with aid of a first program module at least first data are generated that contain at least information for formatting of elements of at least one separator sheet, the elements to be printed on a register tab associated with the at least one separator sheet. The first data are processed with aid of a second program module so that second data are generated via which print data for generation of a print image on the register tab are added to a print data stream. At least the register tab of the one separator sheet is printed with the print image by the printer or copier.

BRIEF DESCRIPTION OF THE DRAWINGS

FIG. 6 shows a user interface for generation of individual texts as well as for selection of a file that contain the print images for printing of the separator sheet;

FIG. 10 shows a user interface for insertion of separator sheets into an existing document;

DESCRIPTION OF THE PREFERRED EMBODIMENT

Figure 1:
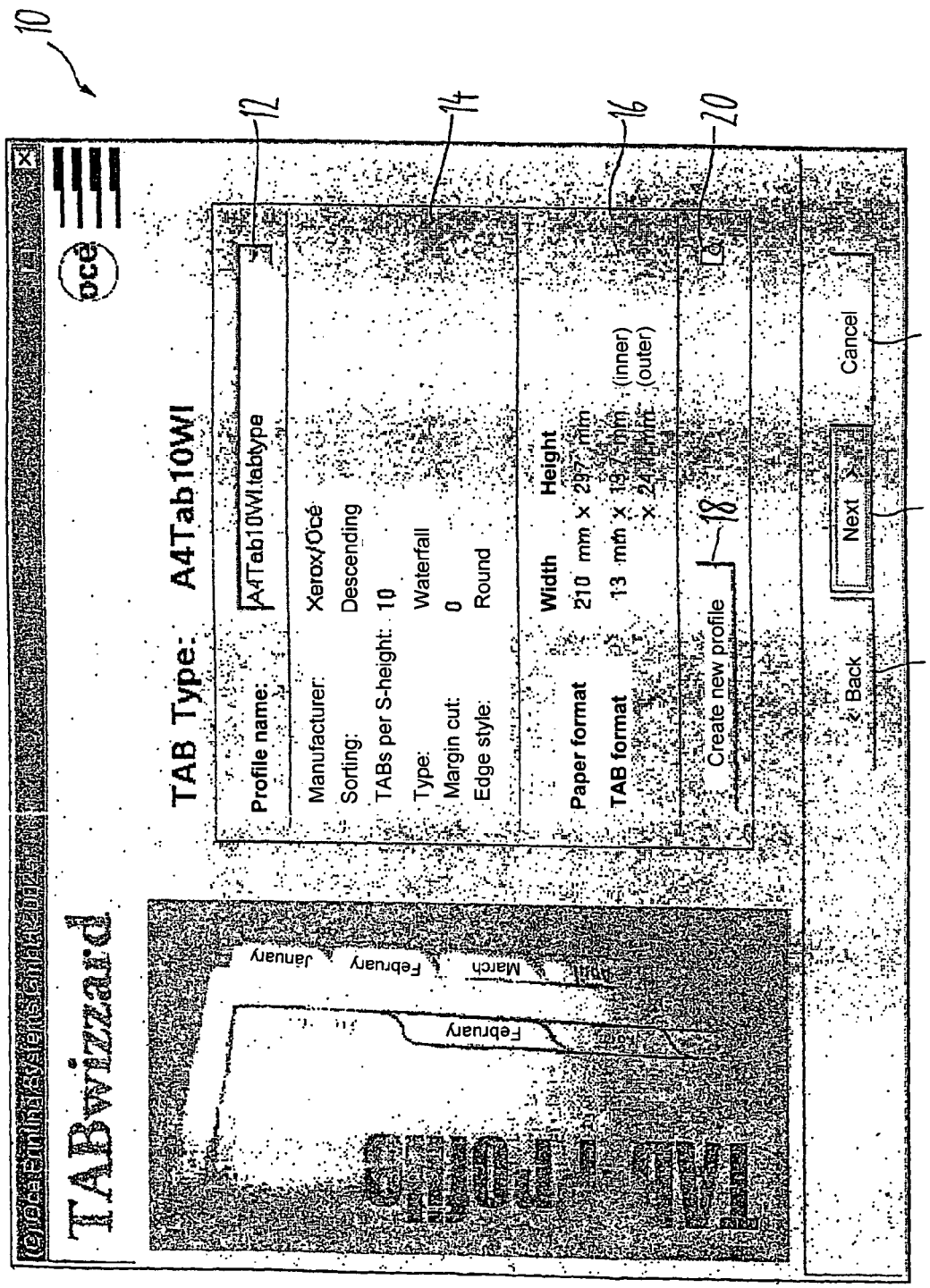
FIG. 1 shows a user interface for generation of information for printing of separator sheets.

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

Via a division of the processing steps for execution with the aid of a first program module and with aid of a second program module, the generation and configuration of the print images for the separator sheet and the further processing of this configuration information and the inclusion into a print data stream by two data processing systems is possible with different operating systems. The execution of the program modules on data processing systems with different operating systems is also designated as execution on different platforms. In particular no special interface is necessary for execution of the second program module. The second program module only has to be invoked with predetermined parameters and data are generated for integration into the print data stream. An automated workflow is also thereby simple to realize.

A second aspect of the preferred embodiment concerns an arrangement for printing of a separator sheet, in particular with the aid of an electrophotographic printer or copier. A first data processing system executes a first program module that generates first data that contain at least information for formatting of elements to be printed on a register tab. A second data processing system executes a second program module that processes the first data and generates the second data. Print data for generation of a print image on the register tab can be added to a print data stream with aid of the second data. An electrophotographic printer or copier prints at least the register tab of the separator sheet with a print image.

Via this arrangement of the preferred embodiment, it is achieved that both the arrangement, design and formatting of elements of a separator sheet to be printed on the register tab and the inclusion of graphic elements according to this information into a print data stream occurs in a very simple manner and without elaborate operator control actions. Furthermore, it is possible via this arrangement of the preferred embodiment that the generation of the first data and the processing of the second data can occur not only at various points in time but rather can also occur with aid of various data processing systems, whereby a very flexible workflow for generation of whole documents that contain separator sheets is possible in a simple manner.

A third aspect of the preferred embodiment concerns a computer software that comprises commands and data in coded form that, after loading, induce a computer system to execute the method steps of the preferred embodiment.

Via such a computer software it is achieved that the printing of separator sheets (in particular with the aid of an electrophotographic printer or copier) is possible in a very simple manner and without significant operator interactions by an operating personnel.

FIG. 1 shows a user interface that is output with aid of a graphical user interface of a first data processing system. With the aid of the user interface 10, what is known as a separator sheet profile can be selected with the aid of a pull-down menu from a plurality of default and stored separator sheet profiles. The separator sheet profile "A4Tab10WI.tabtype" is currently selected. Significant adjustments of the separator sheet profile, such as the producer of the separator sheets, the sorting of the register tabs, the number of the register tabs at the separator sheet height, the type of the register tabs, the margin cut and the edge style of the separator sheet are specified in section 14 of the user interface 10 corresponding to the default settings of the selected profile. A default separator sheet profile preferably concerns a separator sheet set, whereby the combined register tabs of a separator sheet set yield the total height of a separator sheet. A plurality of separator sheet sets can also be associated with a document. The paper format of the separator sheet without register tab and the format of a register tab are specified in section 16 of the user interface 10.

A register tab is also designated as a tab or a register slip. A new profile with specifications that are contained in the sections 14 and 16 for the presently-selected profile can be generated for a further separator sheet set with the aid of the graphical function key 18, whereby this separator sheet set then created is added to the existing separator sheet profiles and can subsequently be selected via the pull-down menu 12. With the aid of the graphical function key 20, a preview is possible of a separator sheet set that is output after activation of this graphical function key 20 in a separate screen window on the display unit on which the user interface 10 is shown.

Figure 2:
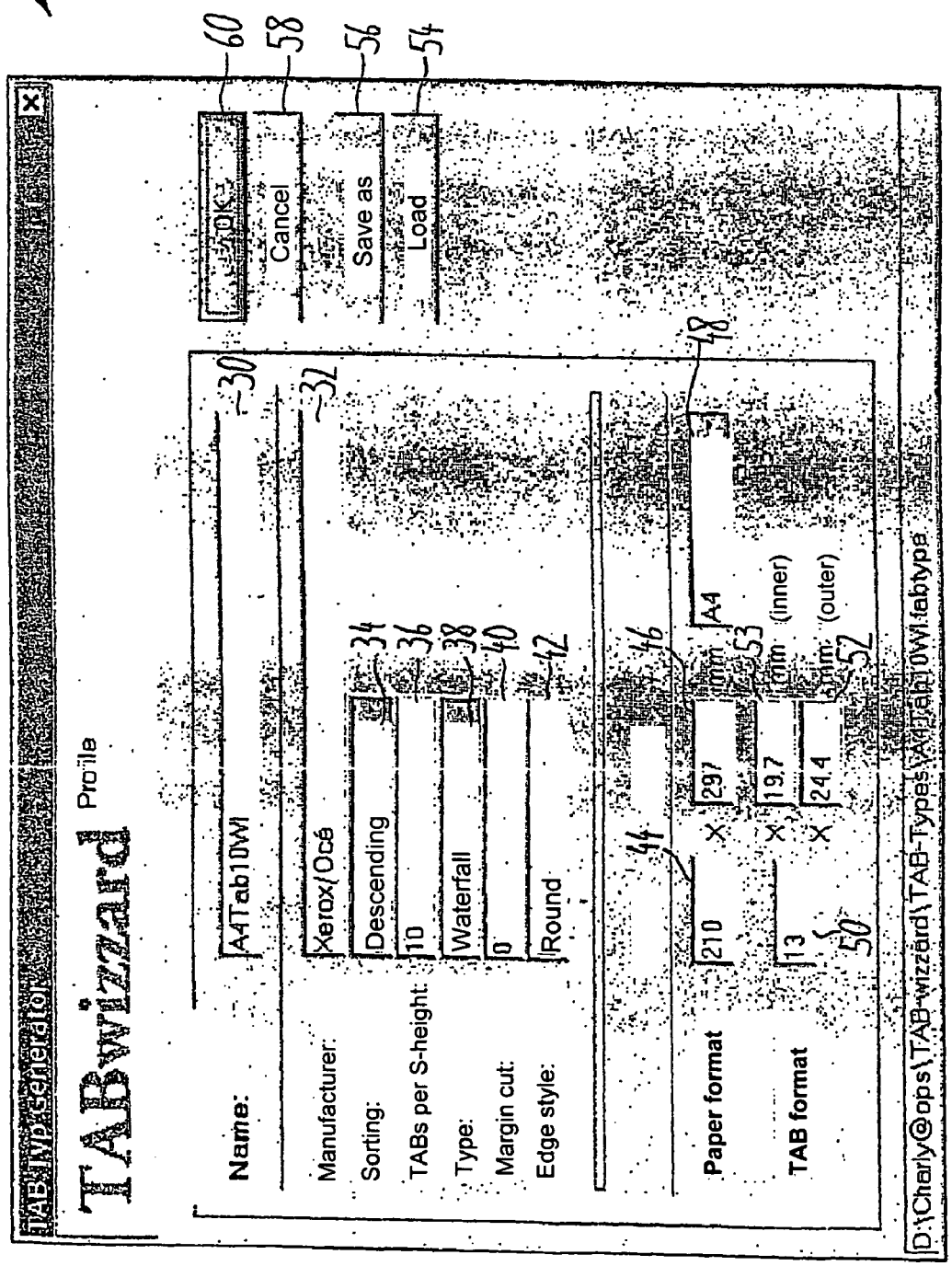
FIG. 2 illustrates a user interface for generation of a new separator sheet profile.

After the activation of the graphical function key 18, the user interface 28 shown in FIG. 2 is output on the display unit. As already mentioned, a new separator sheet profile is generated with the aid of the user interface 28. The name of the separator sheet profile to be generated is input and subsequently displayed with the aid of an input and output field 30. A manufacturer for the pre-manufactured separator sheet set for which the current profile is generated is entered into the input and output field 32. A sorting of the register tabs is established with the aid of a pull-down menu 34, whereby a selection can be made between ascending and descending sorting of the register tabs. The number of the register tabs per page height is established in the input and output field 36. The separator sheet type is selected in the input and output field 38 with the aid of a pull-down menu, whereby the type "waterfall" and the type "single slip" can be selected.

The margin cut of the register tabs is input in the input and output field 30, and the edge style of the register tabs is input in the input and output field 42. The paper format of a separator sheet without register tab is entered as a value in mm with the aid of the input and output fields 44 and 46. Alternatively, a standard paper format (for example the paper format A4) can be selected with the aid of a pull-down menu 48, whereby the dimensions associated with this paper format are then automatically entered into the input and output fields 44 and 46. The dimensions of a register tab are specified in mm in the input and output fields 50, 52, 53. A separator sheet profile selectable via the pull-down menu 12 according to FIG. 1 is loaded with the aid of the graphical function key 54 and changed with the aid of the input and output fields 30 through 53.

A further control panel with a dialogue for storage of the newly created or changed separator sheet profile is invoked with the aid of the graphical function key 56. The changes input in the input and output fields 30 through 53 are discarded with the aid of the graphical function key 58 and these changes are confirmed with the aid the graphical function key 60, whereby after activation of the graphical function key 58 or 60 the user interface according to FIG. 2 is no longer output by the display unit and the user interface 10 according to FIG. 1 is subsequently displayed.

Figure 3A:
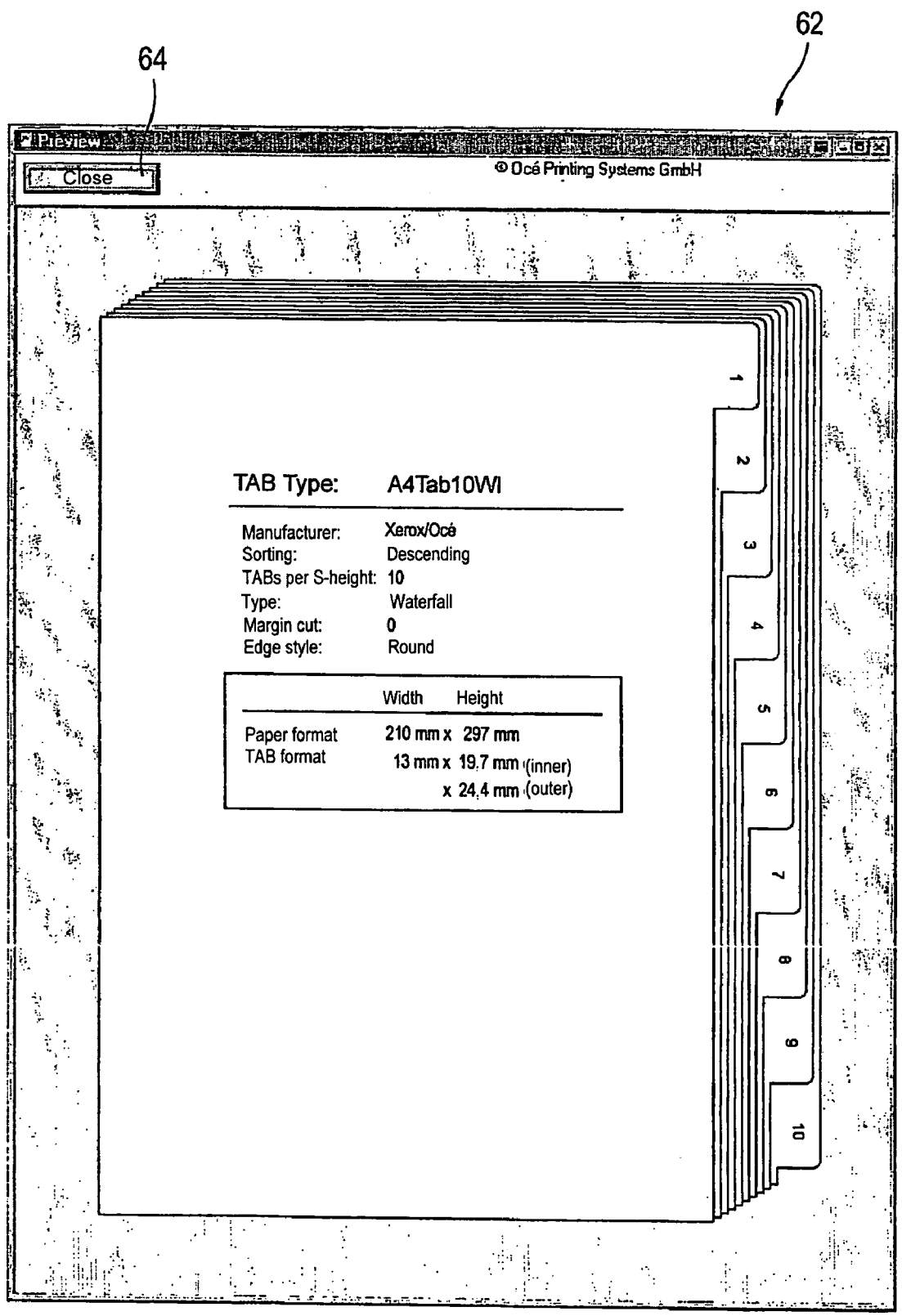
FIG. 3a illustrates a preview of a separator sheet set according to the separator sheet profile configured in FIG. 2 according to a first default setting.

As already mentioned, a preview of a separator sheet set is activated with the aid of the graphical function key 20 of the user interface 10 according to FIG. 1. This preview is output in a separate screen window on the display unit. Such a screen window 62 is shown in FIG. 3a for the selected separator sheet profile "A4Tab10WI.tabtype". The separator sheet set shown in FIG. 3a contains ten register tabs, whereby the register tabs are sorted in descending order and arranged according to the type "waterfall". In the type "waterfall", the register tab 1 has a height of ⅒ of the page height of 297 mm of the A4 paper format. The register tab 2 has ²⁄₁₀ of the height of the paper format of the separator sheet, whereby half of the height of the register tab 2 of the separator sheet height is covered by the register tab 1. The register tab 3 has a height of ³⁄₁₀ of the total height of the separator sheet, whereby ⅔ of the register tab 3 are covered by the register tab 2. The subsequent register tabs respectively have a height of ⅒ of the total height of the separator sheet in addition to the total height of the register tab of the preceding separator sheet. The register tab 10 of the separator sheet set according to FIG. 3a thus has the total height of the separator sheet. The screen window 62 can be closed with the aid of the graphical function key 64, whereby a preview of the separator sheet set is no longer displayed.

Figure 3B:
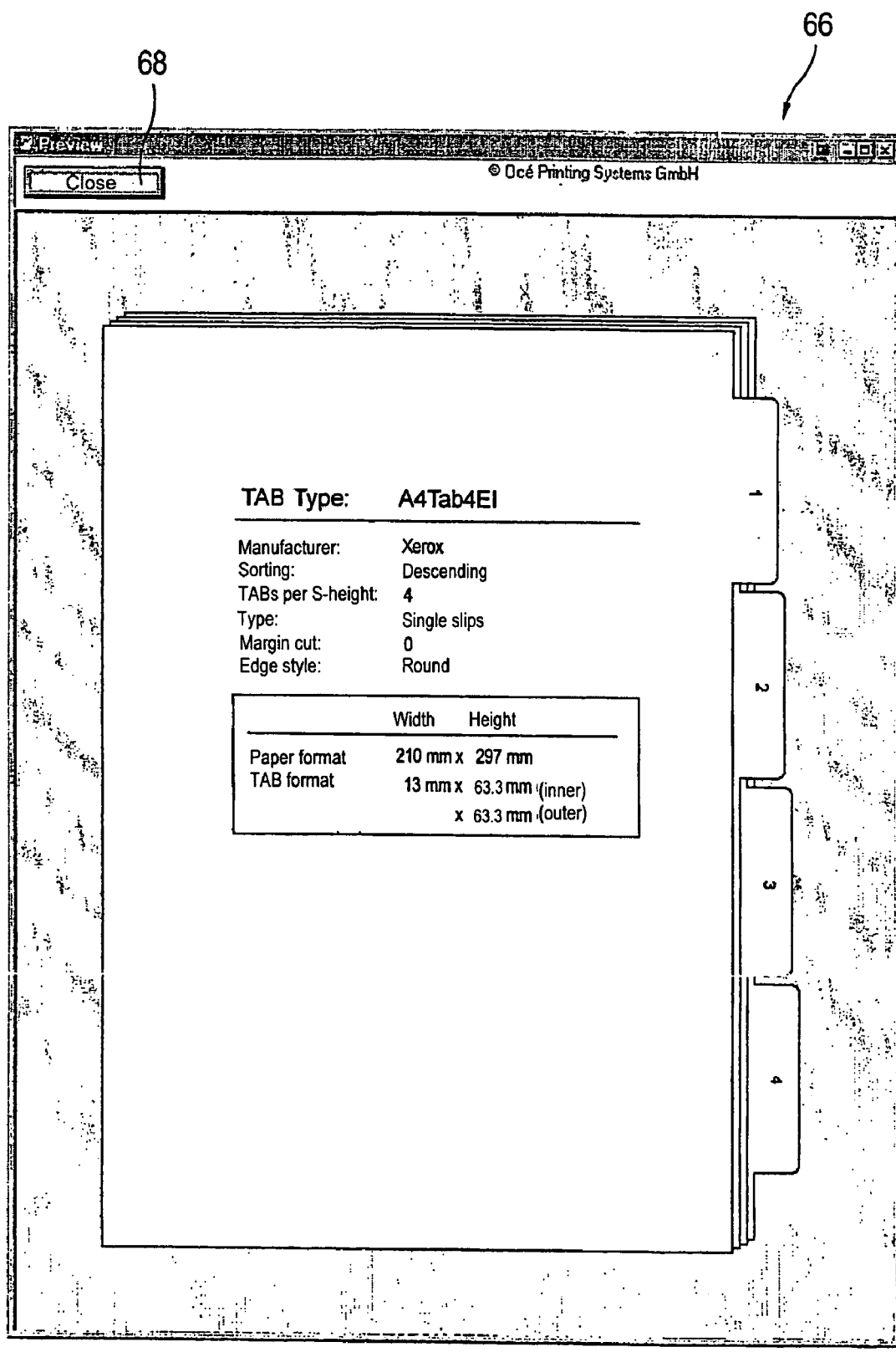
FIG. 3b illustrates a preview of a separator sheet set according to the separator sheet profile configured in FIG. 2 according to a second default setting.

A screen window 66 with a preview of a separator sheet profile whose register tabs are sorted in descending order and that contains four single slips is shown in FIG. 3b. The separator sheet profile according to FIG. 3b also has a margin cut of 7 mm and a setting for round card edges. The paper format of the separator sheet is likewise the A4 paper format, whereby the registration tables respectively have a height of 63.3 mm. In contrast to the type "waterfall", in the type "single slips" the lower edge of the first register tab is arranged at the same height of the second sheet, as the upper edge of the second register tab and the lower edge of the second register tab are arranged at the same height as the upper edge of the third register tab. The lower edge of the third register tab has the same height as the upper edge of the fourth examination region. The upper edge of the first register tab and the lower edge of the fourth register tab have a separation of 7 mm from the upper edge of the separator sheet or from the lower edge of the separator sheet. The screen window 66 is closed with the aid of the graphical function key 68.

An assistant for formatting and configuration of designs of separator sheets of one or more separator sheet sets is available to the user interface 10 and the further, subsequently shown user interfaces. The assistant supports an operating personnel in the configuration and in the input of data, in particular for labels and for generation of graphic elements on the separator sheets of at least one separator sheet set, including the register tabs of the separator sheet set. Individual user interfaces of the assistant can be switched between with the aid of the graphical function keys 22, 24, 26 contained in the graphical user interface 10, whereby the assistant is ended via the graphical function key 26. The graphical function keys 22, 24, 26 are also contained in other user interfaces of the assistant and are subsequently designated with the same reference characters.

Figure 4:
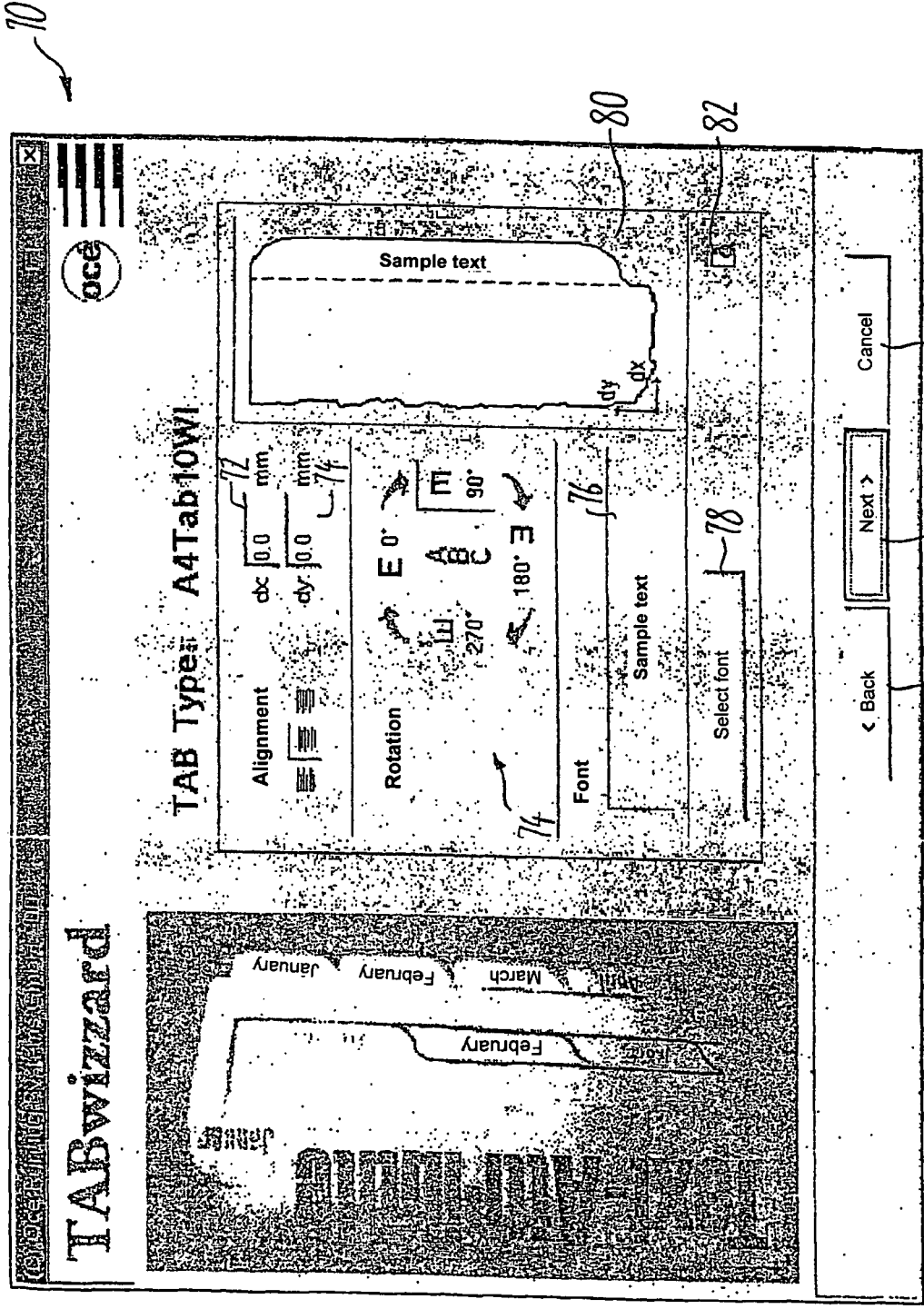
FIG. 4 shows a user interface for formatting of text on a register tab.

A user interface 70 for formatting of the text to be printed on a register tab is shown in FIG. 4. The alignment of the text is thereby preset in a first section 72, whereby a selection can be made between right-justified, left-justified and centered text, and the displacement of the text in the x-direction and y-direction can be adjusted with the aid of selection fields. The rotation of the text on the register tab can be preset in the section 74. A sample text via which the character formatting of the text to be generated on the register tab is shown is displayed in a third section 76. A menu for adjustment of the character formatting of the text to be generated on the register tab can be invoked with the aid of the graphical function key 78.

The sample text is then shown in a corresponding formatting in the section 76 after the change of the font type, font size, display type or font color. According to the settings in the first section 72, in the second section 74 and in the third section 76, a preview of a register tab is displayed in a fourth section 80. The preview of a complete separator sheet set, namely the preview according to FIGS. 3a and 3b, can also be activated with the aid of the graphical function key 82.

Figures 5A, 5B:
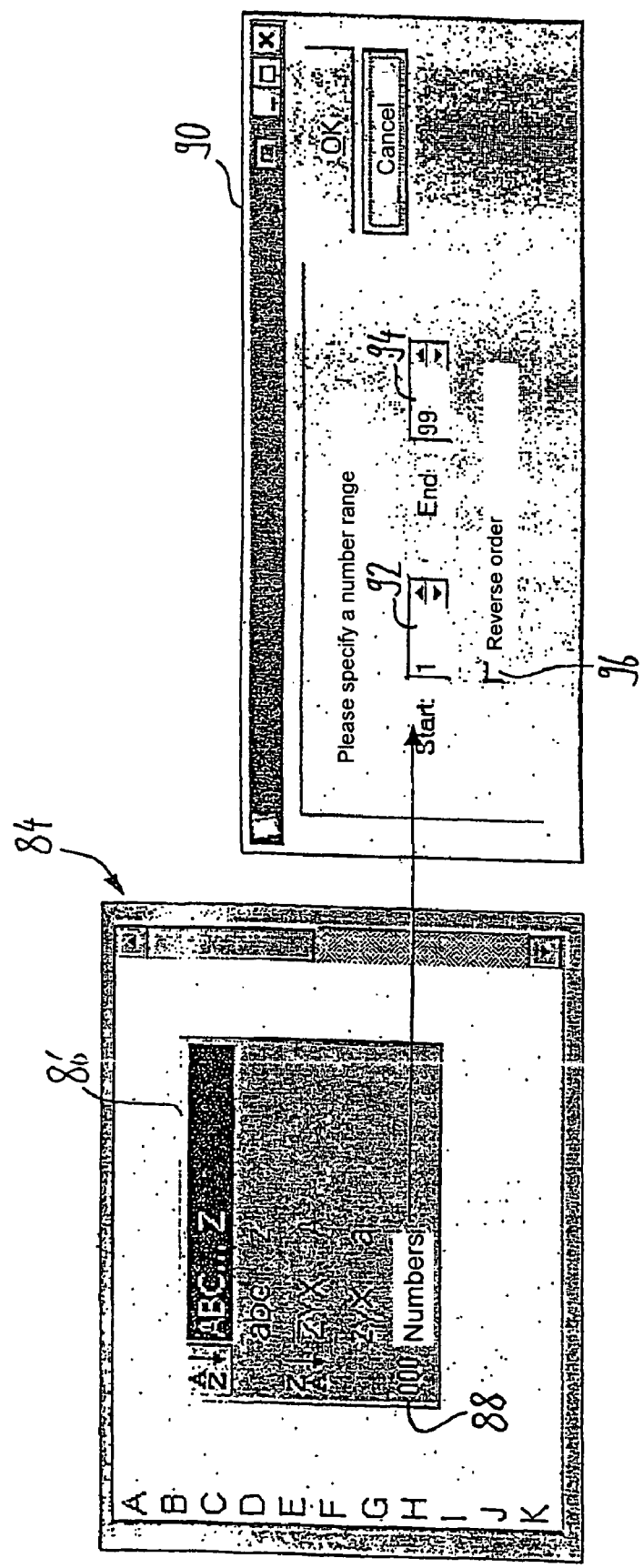
FIG. 5a illustrates a section of a user interface for automatic generation of texts that are printed on the register tab of a separator sheet set.
FIG. 5b shows a user interface for selection of a number range, whereby the user interface is output via the user interface according to FIG. 5a based on the selection of the menu item "numbers"

A user interface 84 via which a text can be selected and configured for automatic labeling is shown in FIG. 5a. The user interface 84 contains a selection window 86 in which various types of standard labels of the register tabs can be selected. The register tabs of the separator sheet set can thus respectively be printed as a standard label with an uppercase lettering or lowercase lettering of the alphabet in descending or ascending order or with a number. If, for example, the menu item "numbers" 88 is selected, the user interface 90 is output on the display unit in addition to the user interface 84. The user interface 90 contains a first input and output field 92 in which a number value can be entered, which number value is printed on the register tab of the first separator sheet of the separator sheet set. A number value that specifies the end of the number range that is used for the standard labeling of the register tabs of the separator sheet set or of a plurality of separator sheet sets can be entered into the input and output field 94. The order of the number range can be reversed with the aid of the check box 96, such that the number value 99 is printed on the register tab of the first separator sheet and the number value 1 is printed on the register tab of the last separator sheet.

Figure 6:
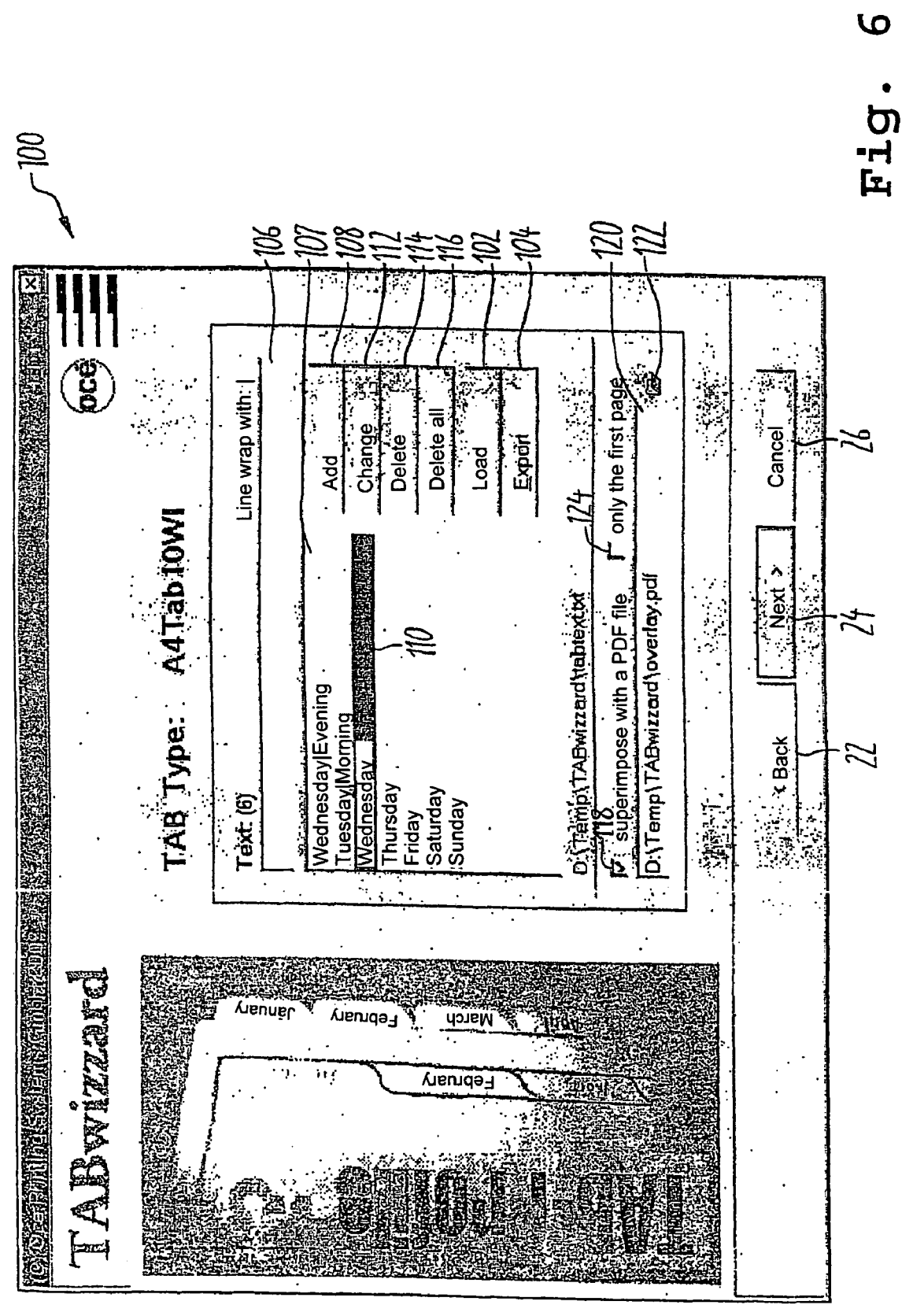

A user interface 100 is shown in FIG. 6 via which labeling texts that serve for labeling of the register tabs of the separator sheets are selected and generated. A dialogue for loading of text data that should serve for labeling of the register tab is opened with the aid of the graphical function key 102 and a dialogue for exporting or for storage of generated or modified label texts is activated with the aid of the graphical function key 104. Text files in which the texts of successive register tabs are separated by commas are preferably loaded. A text that should be added to a text list is input in an input and output field 106. A line wrap is forced with the aid of a perpendicular line in the input. Such a line is also designated as a "pipe". The already-input texts are displayed in a display field 107, whereby a register tab is respectively associated with a line and the order of the lines in the section 107 is then generated on the register tabs of successive separator sheets. The text of the lists input in the input field 107 is inserted below the line marked by a marking 110 via activation of the graphical function key 108. The text of the line provided with a marking 110 can be displayed and changed in the field 106 with the aid of the graphical function key 112. The line or the entry selected via the marking 110 is deleted with the aid of the graphical function key 110. All texts displayed in the section 107 are deleted with the aid of the graphical function key 116. An index on a fixed disc storage of a data processing system as well as a file name in which or under which the input or changed data are stored are specified below the list 107.

Figure 7:
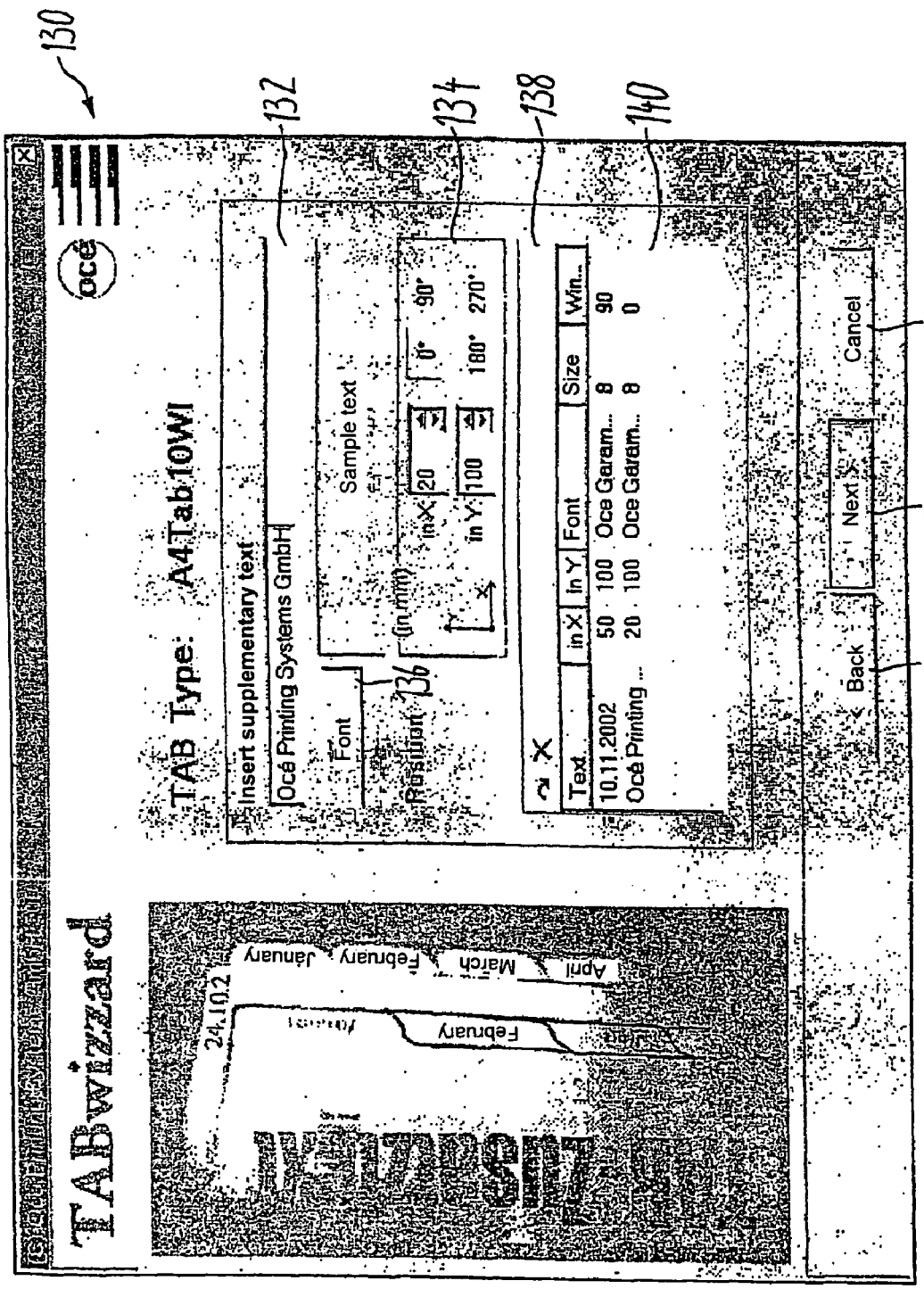
FIG. 7 illustrates a user interface for generation of graphic elements that should be generated on all separator sheets.

With the aid of a selection field 118 (what is known as a check box), via activation of the check box it is established that the separator sheets are superimposed with print images that are stored in a Portable Document Format file (PDF). The storage location and file name of the PDF file in which the print data of print images are stored can be input and output in the input and output field 120. A dialogue for searching through data sources and for selection of a file with the print images can be activated with the aid of the graphical function key 122. The print image that is associated with the first print page in the selected file is generated on each separator sheet via activation of the check box 124. In FIG. 7, a user interface 130 is shown via which the further graphic elements that are subsequently generated on the separator sheets are generated and/or selected. The graphic elements established with the aid of the graphical user interface 130 are then generated at the preset position on each separator sheet. A text that is generated on each separator sheet at a position that is established with the aid of the setting fields in the section 134 of the user interface 130 is input in the input and output field 132.

A dialogue to establish the font type can be selected with the aid of the graphical function key 136. Both the position and the rotation of the input text can be selected in the section 134. With the aid of a toolbar 136 of the user interface 130, the text input in the input and output field 132 with the associated position specifications of a list can be added with supplementary texts to be generated on each separator sheet. The respective supplementary text is again removed from the list via selection of a text in the list 140 and activation of the delete symbol in the toolbar 138.

Figure 8:
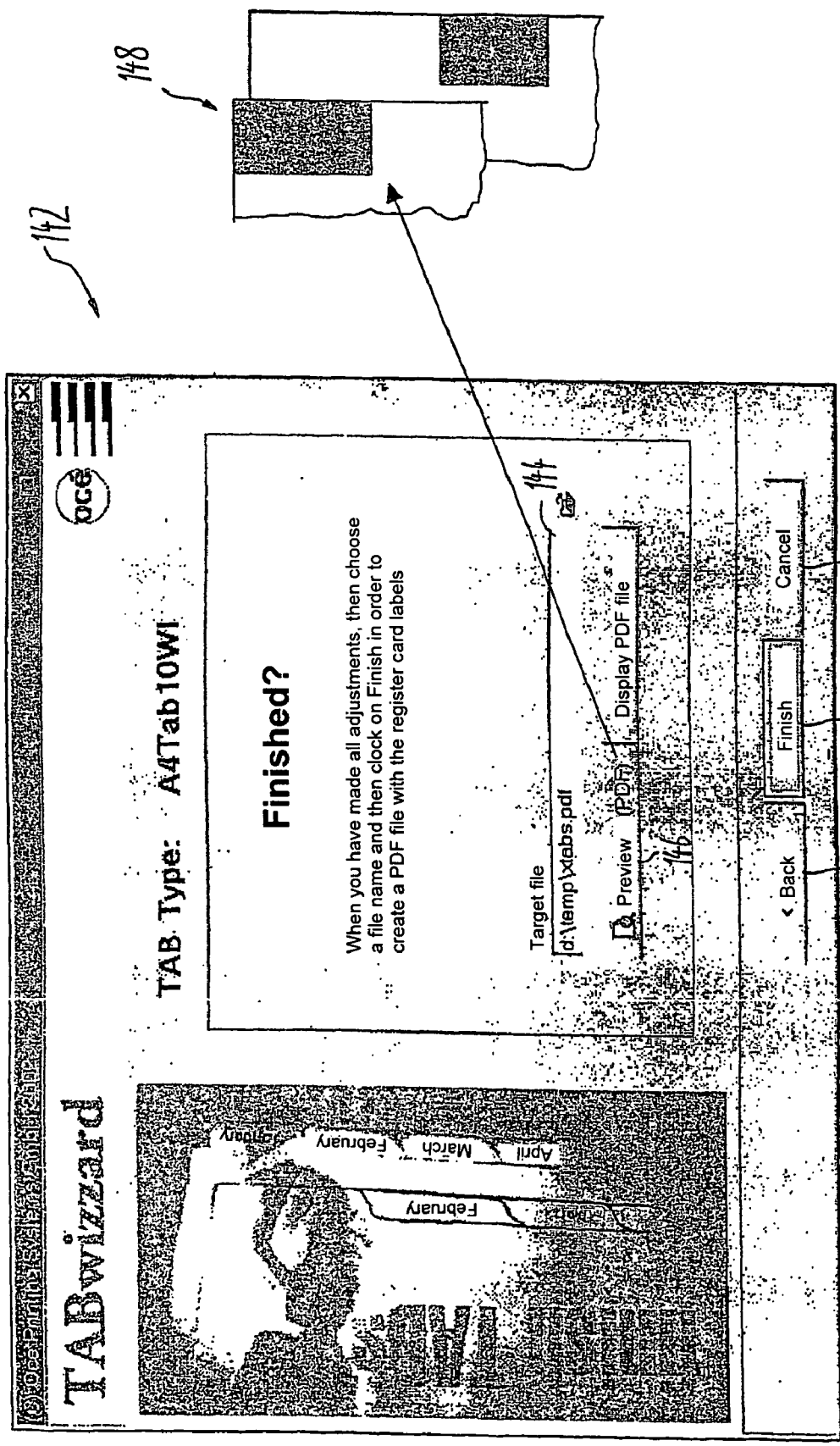
FIG. 8 is a user interface to establish a target file and for generation of a print image preview of at least one register tab.

A user interface 142 is shown in FIG. 8. The file name of a target file is input in an input and output field 144 to store the settings effected with the aid of the previously-specified user interfaces. Print data in a portable document format (PDF) are then stored in this target file. Such a portable document format is, for example, PDF by the company Adobe. A preview 148 of the separator sheets is possible with the aid of the graphical function key 166. The creation of the separator sheets with the aid of the assistant ends with the graphical function key 150 and the separator sheets are stored in the selected PDF file.

Figure 9:
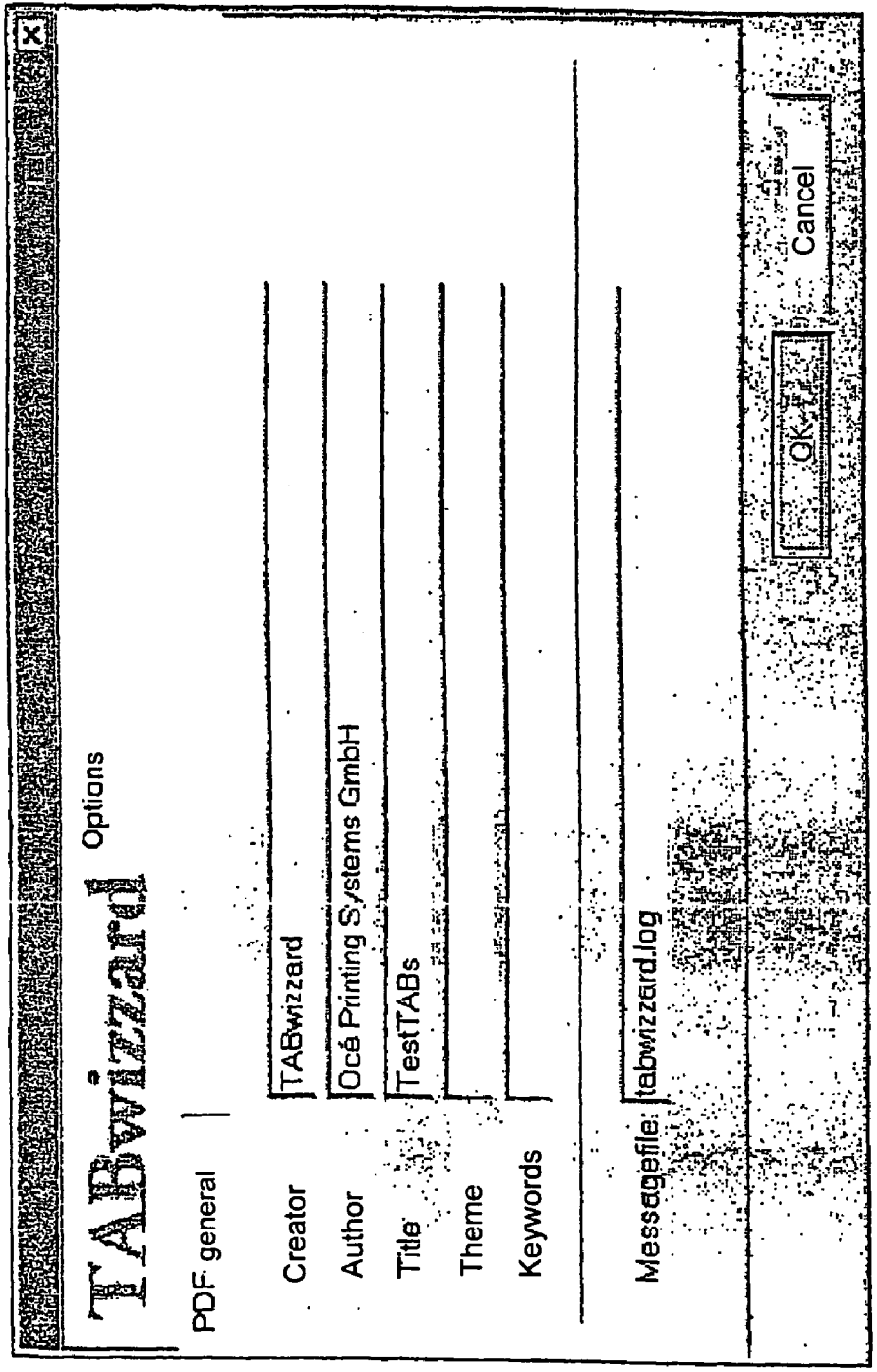
FIG. 9 illustrates a user interface for input of file information of a file to be generated with print data.

A user interface 152 via which file information are input into and associated with a PDF file is shown in FIG. 9. Thus, for example, the name of the program module, the author, the title and the theme as well as an event record file (what is known as a log file) can be specified. The user interface 152 can, for example, be activated via activation of the input and output field in FIG. 8 with the aid of the right mouse button.

Figure 10:
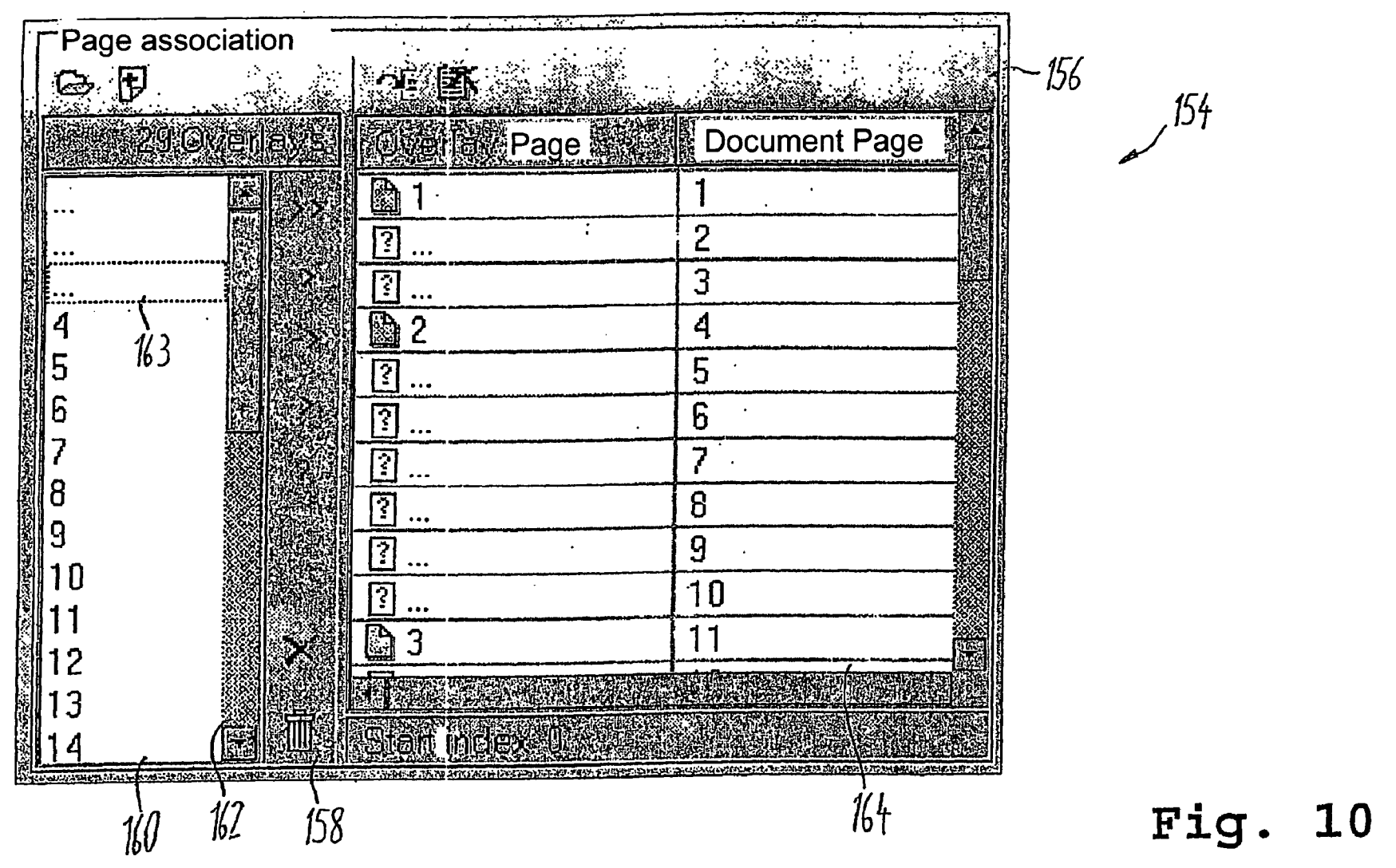

A user interface 154 is shown in FIG. 10 via which the separator sheets contained in a PDF file can be associated with a document likewise present as a PDF file and be inserted into this existing document. The user interface 154 has a first toolbar 156 and a second toolbar 158. The separator sheets generated with the aid of the assistant are shown as pages 1 through 14 in a first display and selection field 160. Further generated separator sheets can be displayed in the field 160 with the aid of the positioning bar 162. A page to be inserted into the document can be selected with the aid of a marker 163 and be inserted (with the aid of function keys of the second toolbar 158) at a position specified in the display and selection field 164. The insertion position of the third separator sheet is at the eleventh position of the overall document in the first column of the display and selection field 164. According to FIG. 10, a first separator sheet is inserted into the overall document as page 1, a second separator sheet is inserted into the overall document as page 4 and a third separator sheet is inserted into the overall document as page 11.

Figure 11:
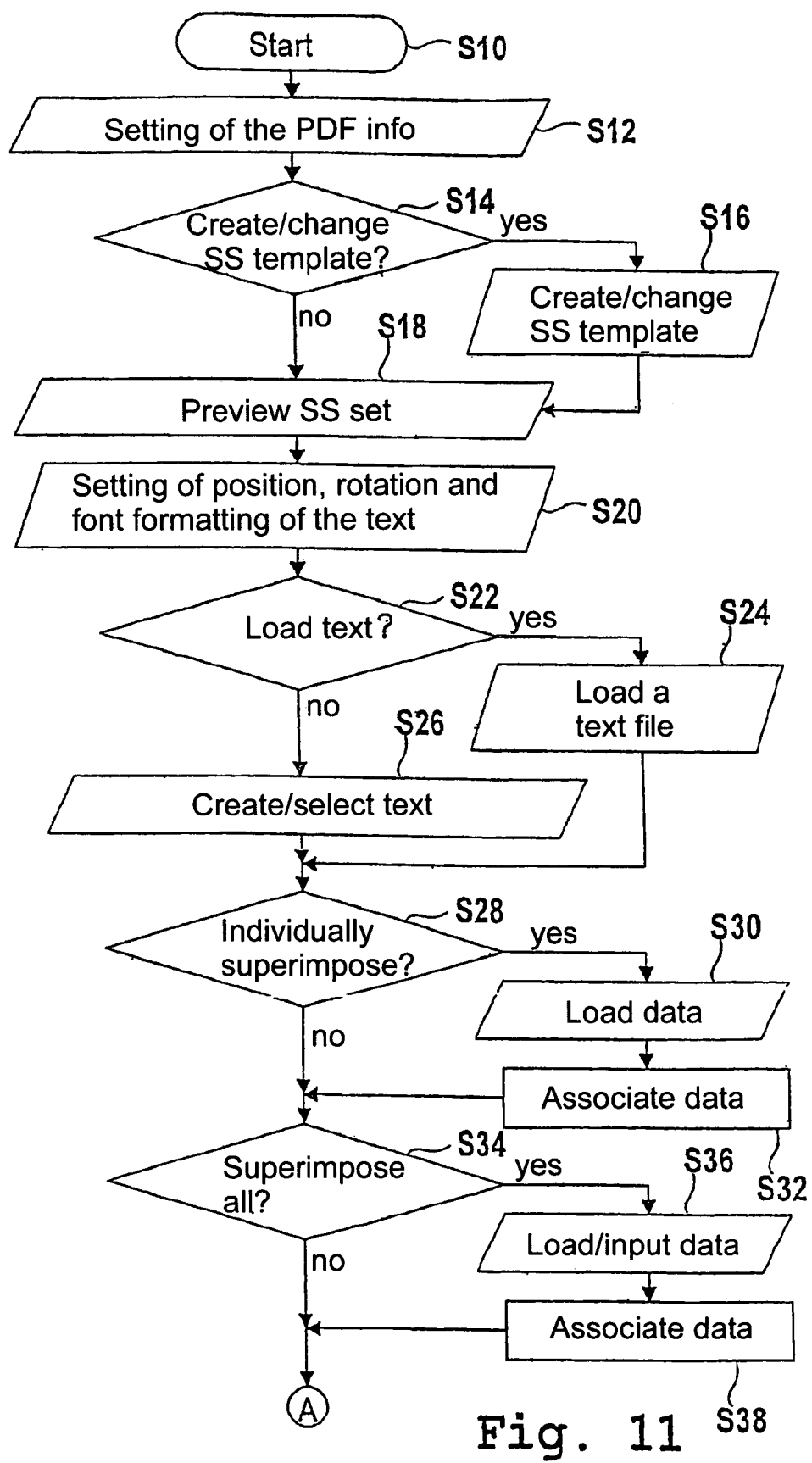
FIG. 11 illustrates the first part of a workflow of a first program module for generation of data for printing of separator sheets.
Figure 12:
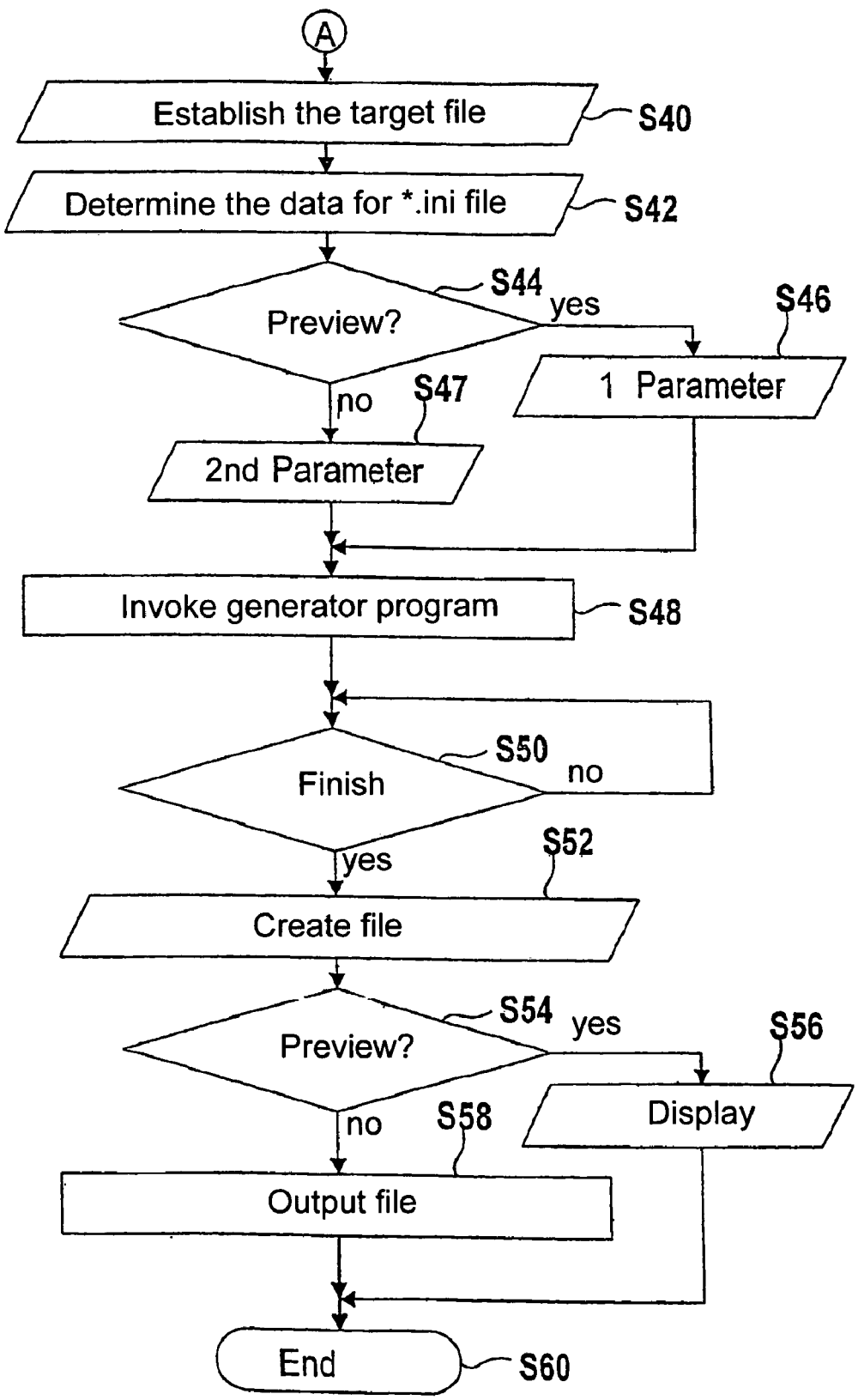
FIG. 12 shows the second part of the workflow according to FIG. 11.

A workflow of a first program module for generation of print data for separator sheets is shown in FIGS. 11 and 12. The workflow is started in the step S10. File information of a PDF file is input in step S12, for example with the aid of a user interface according to FIG. 11.

In step S14, via an operator control action it is subsequently selected whether a new separator sheet template is generated or an existing separator sheet template should be changed. If this is the case, in step S16 a new separator sheet template is thus created or an existing separator sheet template is changed.

However, if, via an operator input in step 14, it is selected that no separator sheet template is created or changed or if the step S16 for creation or modification of a separator sheet template is terminated, a preview of the selected separator sheet set occurs in step S18. The position, rotation and font formatting of the text to be generated on a register tab or texts to be generated on the register tabs is subsequently set in step S20. In step S22, it is subsequently selected via an operator control action whether an existing text should be loaded. If a new text should be loaded, a text file is loaded in step S24. However, if no text present as a text file should be loaded, in step S26 a new text is created or a text is selected from standard texts for the register tabs of the separator sheet set.

If the text file was loaded in the steps S24 or a text was created or selected in the step S26, in the step S29 it is subsequently selected with a user input whether the individual separator sheets should be superimposed with print images that are stored in a PDF file, whereby the print data are associated with respective print pages in this PDF file.

If the separator sheets should be superimposed with further print pages, in the step S30 the data are loaded from the PDF file. The loaded data are subsequently associated with the individual separator sheets in the step S32. If the data have been associated with the individual separator sheets in the step S32 or if, in step S28, it is determined that the separator sheets should not be individual superimposed with print images, the workflow continues in step S34. In the step S34, it is checked whether all separator sheets should be superimposed with further graphic elements, whereby the same graphic elements are then printed on each separator sheet. If this is the case, data for generation of these graphic elements to be generated on each page are thus loaded from a file or input via a user interface.

These data are subsequently associated with each of the separator sheets in step S38. If the data have been associated with the separator sheets in step S38 or if it was established in step S34 that the separator sheets should not be superimposed with further print images, in the step S40 a target file is established in which the print images of the separator sheets are stored with the aid of a PDF file. Formatting data of the separator sheet set (first data) are subsequently determined and stored in an initialization file (ini file) in the step S42. The initialization file in particular contains format information about the separator sheet set and format information for positioning and formatting of the text on the register tabs of the separator sheet set. The text data (third data for a first print job, or fourth data for a second print job) of the register tab texts and print image data for further print images that should be generated on the separator sheets outside of the tab (fifth data) are preferably stored in separate files that are then loaded for generation of the target file by a generator program module and are processed together with the information stored in the initialization file. The target file is then generated with the aid of the processed data.

In step S44, it is subsequently checked whether a preview of the finished separator sheet set should be generated. If this is the case, in step S46 a first parameter set is subsequently generated with which a generator program module is subsequently invoked in step S48. If, in step S44, it is established that no preview should be generated, a second parameter set is subsequently generated in step S47 and the generator program module is subsequently invoked in step S48. After the step S48, in step S50 it is checked whether the generator program module has generated data of the target file. If this is not the case, step S50 is repeated. The program steps of the generator program module are explained in still closer detail in the following in connection with FIG. 13. If in step S50 it is established that the generator program module has processed the data corresponding to the parameters, the target file is created in step S52. In step S54, it is subsequently checked whether the data contained in the file contain data for a preview display of the separator sheet set or data for printing of the separator sheet set. In addition to the data for printing of the separator sheet sets, the data for preview of the separator sheet set contain further data via which the outlines of the separator sheets of the separator sheet set are also shown in a preview.

If, in step S54, it is established that the data should serve for a preview of the separator sheet set, in step S56 a separator sheet set is output in a preview display on a display unit. However, if, in step S54, it is established that no preview of the separator sheet set should occur, in step S58 the PDF file is subsequently stored or transferred to a print server or directly to a printer for output with the aid of an electrophotographic printer. After the display of the preview or the output of the print data in steps S56 or S58, the workflow is ended in step S60.

Figure 13:
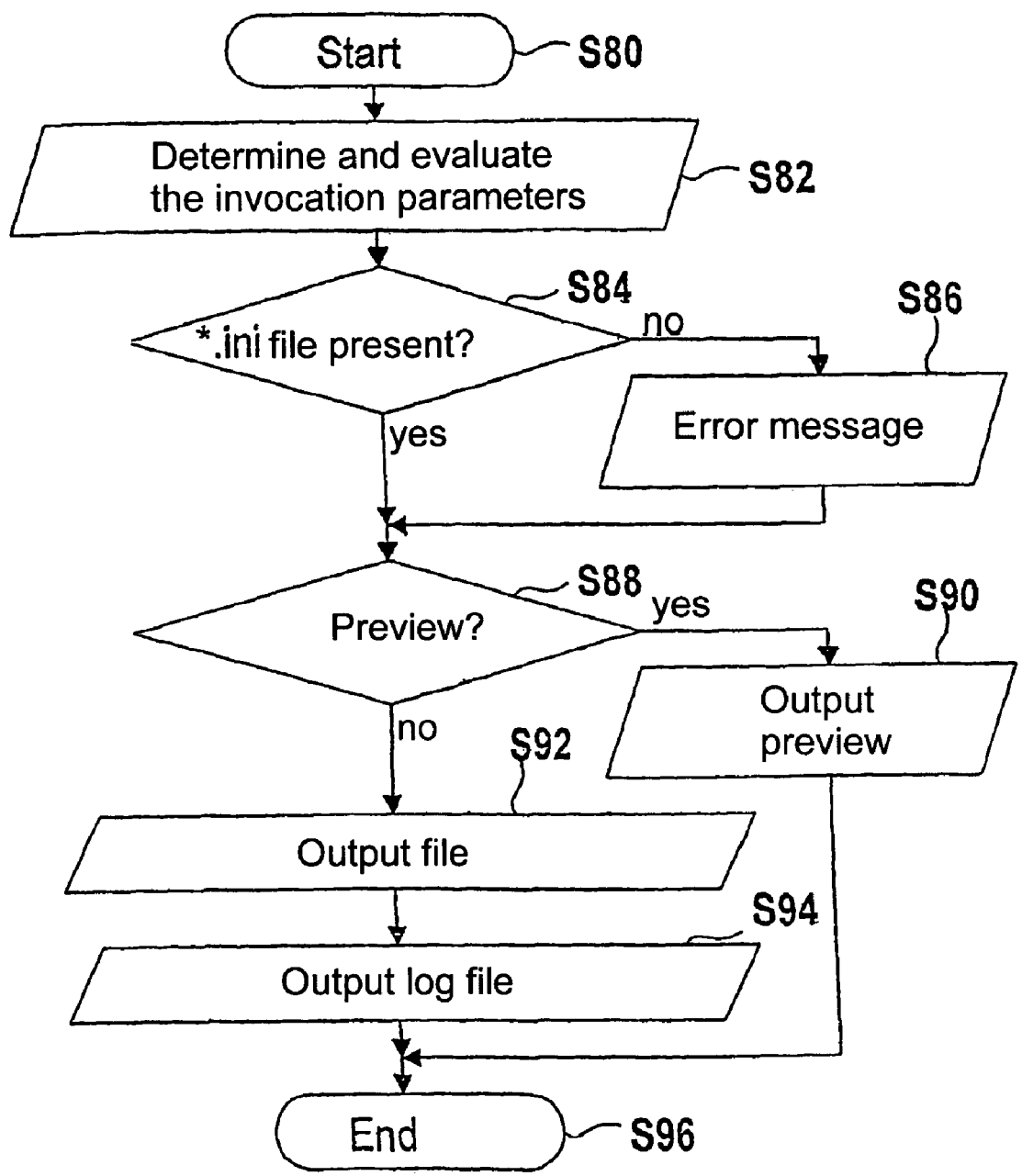
FIG. 13 illustrates a workflow for generation of print data with the aid of a second program module from configuration data that have been generated with the aid of the first program module.

A workflow of the generator program module for generation of print data with the aid of formatting information is shown in FIG. 13. As already explained in connection with FIGS. 11 and 12, the formatting information have been generated with aid of a first program module, preferably an assistant program module. The workflow is started in step S80. In step S82, it is subsequently determined with which parameters the generator program module has been invoked. Furthermore, the invocation parameters are evaluated. In step S84, it is subsequently checked whether either an initialization file is present. If this is not the case, an error message is output in the step S86.

If, in step S84, it is determined that an initialization file is present, in step S88 it is subsequently checked whether the separator sheets should be generated. If this is the case, print data are generated with preview information and are transferred to the first program module according to FIGS. 11 and 12 in step S90. The workflow is subsequently ended in step S 96. However, if in step S88 it is established that no preview of the separator sheets should occur, in step S92 a file is subsequently output with print information and print data associated per page. A log file in which the generation of the print data for printing of the separator sheets with aid of the generator program module is documented step-by-step is subsequently generated and output in step S94. The workflow is subsequently ended in step S96.

Due to the separation of a program for configuration and formatting of separator sheets in the preferred embodiment, the generation of texts or graphic elements for printing of the print images and/or of a generator program module for generation of print data based on the formatting information and the data of the graphic elements, variable solutions for generation of separator sheets with the aid of various platforms independent of existing interfaces are simple to realize and can be very easily adapted to working processes, what is known as "workflow". In particular the generator program module is also suitable for what is known as batch operation. Via such a batch operation, automated workflows can be realized in a very simple manner via invocation of the generator program module with predetermined parameters.

The fast generation of different separator sheet sets with predetermined or freely-configured register tabs is possible in a simple manner via the user interfaces shown in FIGS. 1 through 10. An efficient monitoring of each working step is possible via these user interfaces. Errors are prevented. A visualization of the effected settings, whereby an operating personnel can immediately visually detect wrong inputs, is possible at any time via the offered preview in most of the working steps or via an automated preview in individual working steps. The texts to be generated on the register tabs can be selected, generated and processed in a simple manner. In particular a formatting of the text that should be printed on the register tabs is possible in a very simple manner.

A cascaded labeling of the register tabs is also possible in a very simple manner with aid of the first program module. In a cascaded labeling, the letters of a word are arranged one atop another. An arrangement of the text is thereby possible in such a manner on the relatively narrow register slips, whereby this text can then also be simply and quickly read given an arrangement of the separator sheets in portrait format, for example in file folders. In particular the remaining separator sheet area outside of the register tabs can be printed with texts and graphics via an automated superimposition of the separator sheets with an existing PDF file and insertion of additional text elements.

Workflows for creation and configuration of separator sheets can thus be automated with aid of the method, the arrangement and the computer software of the preferred embodiment. Given the selection of separator sheet sets, various separator sheet profiles (in particular a waterfall profile or a single slip profile) can also be selected that are then correspondingly displayed in a preview of the complete separator sheet set. A wrong selection is then immediately visible to an operating personnel. Given uncertainties, for example in the selection of the separator sheet type, an operating personnel is given selection help via the preview. In other exemplary embodiments, it is also possible to select images and graphics that should be printed on the register tabs.

As already described, with aid of the generator program module a preview of the print images to be printed on the separator sheets that is true to the original can be generated and output with the aid of a display program. A very flexible further development and configuration of the entire system is possible in a simple manner via the division into a configuration program module and an executed program. In the present exemplary embodiment, the executed program is the generator program module. A real WYSWYG function (what you see is what you get) is thereby given via which a preview coinciding with the printout is possible. The generator program module can, as already mentioned, also be executed in the batch operation. Given such a batch operation, the generator program module generates print data based on the initialization file with format information. For example, the generator program module can be executed as a Unix script, Java applet or as a Pearl application. The PDF file generated with the aid of the generator program can be further processed in various workflows.

The separator sheets with the register tabs are preferably used for sub-division of legal and regulatory works and in the sub-division of advertising and product information apparatuses. Furthermore, separator sheets are used as registers for telephone directories and for dictionaries and notebooks, whereby the consultation is made easier by these register tabs.

An excerpt from an initialization file is subsequently listed that is executed by the generator program module and contains configuration and formatting information for a separator sheet set.

```
# General PDF Information
creator=TABwizzard
author=Océ Printing Systems GmbH
title=TestTABs
subject=Reqister cards
keywords=
message_file=tabwizzard.log
# The settings for placement of the TAB texts
tab_Paperwidth=595
tab_Paperheight=842
tab_height_TB=69
tab_height=56
tab_width=37
tabsPerPage=10
tabEdge=
move_dx=
move_dy=
label_rotation=270
text_align=l
inverse_TABS=0
# The font and font size to be used
FontName=Oce Garamond
FontSize=10
FontColor=-2147483640
# The internal required file and index structures
labellist_file=D:\Temp\TABwizzard\labelslist.txt
target_PDF=d:\temp\xtabs.pdf
overlay_PDF=D:\Temp\TABwizzard\overlay.pdf
overlay_single=0
# Supplementary text to be inserted
add_textl=Océ Printing Systems GmbH,30,100,Oce Garamond,8,0
add_text2=8.11.200,10,10,Helvetica,10,90
...
#=eof
```

Via this listing of the initialization information that is processed by the generator program, the competent average man skilled in the art receives an indication as to in which form the format information are transferred to the generator production module. The storage locations of text files, files with print images to be superimposed as well as the storage location of the target file are also contained in the initialization data.

Although preferred exemplary embodiments are shown and described in detail in the drawings and the preceding specification, this should be viewed as purely exemplary and not as limiting the application. It is noted that only the preferred exemplary embodiments are shown and described, and all variations and modifications should be protected that presently and in the future lie within protective scope of the invention.

I claim as my invention:

1. A method for generating a separator sheet with a computer system and for printing of said separator sheet with a printer or copier, comprising the steps of:
   a) in a separator sheet file configuration and formatting process
      with aid of a first program module loaded into the computer system and comprising at least one graphical user interface, generating at least first data that contain at least information for formatting of elements of at least one separator sheet, said elements to be printed on a register tab and not a remainder of the separation sheet outside of the register tab associated with the at least one separator sheet,
      providing a remainder print data file for any print data for the remainder of the separation sheet outside of the register tab,
      storing the first data in a formatting file which is separate from the remainder print data file,
      generating and storing a third data in a tab data file which is separate from said formatting file and from said remainder print data file, said third data comprising data of the elements to be printed on the register tab;
   b) in a separator sheet file generating process
      processing the formatting file, the tab data file, and the remainder print data file with a second program module loaded into the computer system so that second data are automatically generated and stored in a separator sheet file; and
   c) in a printing process
      adding said second data of said separator sheet file to a print data stream for generation of a print image on the register tab, and
      printing the one separator sheet with the print image by the printer or copier.

2. A method according to claim 1 wherein the third data that contain data of the elements to be generated on the register tab are generated with aid of the first program module.

3. A method according to claim 2 wherein the third data contain text data or data of graphic elements.

4. A method according to claim 2 wherein the first data and the third data are processed for a first print job with aid of the second program module, the third data being associated with the first print job, and the first data and fourth data are processed for a second print job of the second program module, the fourth data being associated with the second print job.

5. A method according to claim 4 wherein fifth data for generation of a further print image in at least one section of said remainder of the separator sheet outside of the register tab are processed by the second program module such that print data for generation of the further print image are added to the print data stream.

6. A method according to claim 5 wherein the third, fourth, or fifth data can be selected via the first or second program module or can be generated with the help of the first or second program module.

7. A method according to claim 5 wherein the fifth data are associated with a respective print job.

8. A method of claim 5 including the further steps of:
   selecting a template for the separator sheet as said first data;
   text as said third data for the register tab is selected or loaded;
   additional print data as said fifth data for output on said remainder of the separator sheet outside of the register tab is loaded; and
   said additional print data as the fifth data is associated with the separator sheet.

9. A method according to claim 1 wherein the third data that contain data of the elements to be generated on the register tab are generated with aid of a third program module.

10. A method according to claim 1 wherein the first data contain at least information for arrangement of elements of a separator sheet set to be printed on register tabs of the set, and that with aid of the second program module the second data are generated via which print data for generation of respectively one print image on each register tab of the separator sheet set are added to the print data stream.

11. A method according to claim 10 wherein the separator sheet set serves as a sorting aid for a loose-leaf system.

12. A method according to claim 1 wherein the first program module is contained as a program element in a desktop publishing program module as one of the elements selected from the group consisting of a Java applet, plug-in program module, and a linked program element.

13. A method according to claim 1 wherein an assistant function with which all necessary information for generation of the first data can be activated in the first program module.

14. A method according to claim 1 wherein a view of the separator sheet with the register tab of the separator sheet is simulated and displayed with aid of the first program module.

15. A method according to claim 1 wherein the first program module is executed by a first data processing system and the second program module is executed by a second data processing system.

16. A method according to claim 1 wherein the information for the formatting contains specifications regarding at least one of the elements selected from the group consisting of dimensions of the register tab, position of the register tab in a separator sheet set, paper format of the separator sheet, and alignment of the register tab.

17. A method according to claim 1 wherein a preview of a separator sheet with selected settings is possible in the first program module, whereby data with the settings as parameters are transferred to the second program module, the second program module transfers the generated second data to the first program module, and wherein with the first program module the second data are further processed into display data with aid of a program element.

18. A method according to claim 1 wherein a file name of formatting file in which the first data are stored and a file name of the tab data file in which the third data are stored, are specified as parameters in invocation of the second program module.

19. A system for generating and printing a separator sheet, comprising:

a computer system for generating the separator sheet and a printer or copier for printing of said separator sheet;

a) for a separator sheet file configuration and formatting process, a first program module loaded into the computer system and comprising at least one graphical user interface, said first program module generating at least first data that contain at least information for formatting of elements of at least one separator sheet, said elements to be printed on a register tab and not a remainder of the separation sheet outside of the register tab associated with the at least one separator sheet, providing a remainder print data file for any print data for the remainder of the separation sheet outside of the register tab, storing the first data in a formatting file which is separate from the remainder print data file, generating and storing a third data in a tab data file which is separate from said formatting file and from said remainder print data file, said third data comprising data of the elements to be printed on the register tab;

b) for a separator sheet file generating process, a second program module loaded into the computer system, the second program module processing the formatting file, the tab data file, and the remainder print data file so that second data are automatically generated and stored in a separator sheet file; and said computer system adding said second data of said separator sheet file to a print data stream for generation of a print image on the register tab, and the printer or copier printing the one separator sheet.

* * * * *